US008296542B2

(12) United States Patent
Knirsch

(10) Patent No.: US 8,296,542 B2
(45) Date of Patent: Oct. 23, 2012

(54) DYNAMIC MEMORY ALLOCATION FOR APPLICATIONS

(75) Inventor: Philipp Knirsch, Kirchentellinsfurt (DE)

(73) Assignee: Red Hat, Inc., Raleigh, NC (US)

( * ) Notice: Subject to any disclaimer, the term of this patent is extended or adjusted under 35 U.S.C. 154(b) by 493 days.

(21) Appl. No.: 12/571,247

(22) Filed: Sep. 30, 2009

(65) Prior Publication Data
US 2011/0078404 A1    Mar. 31, 2011

(51) Int. Cl.
*G06F 12/00* (2006.01)

(52) U.S. Cl. ........ 711/170; 711/145; 711/154; 711/156; 718/104

(58) Field of Classification Search ................. 711/170, 711/145, 154, 156; 718/104
See application file for complete search history.

(56) References Cited

U.S. PATENT DOCUMENTS

| 5,889,990 | A  | * | 3/1999 | Coleman et al. | 719/322 |
| 6,499,094 | B1 | * | 12/2002 | Fraser et al. | 711/171 |
| 7,827,375 | B2 | * | 11/2010 | Abrashkevich et al. | 711/170 |

OTHER PUBLICATIONS

"GNU C Library", accessed at: http://en.wikipedia.org/wiki/Glibc on Aug. 21, 2009, last modified on Aug. 9, 2009, 3 pages.
"Dynamic Memory Allocation", accessed at: http://en.wikipedia.org/wiki/Dynamic_memory_allocation on Aug. 21, 2009, last modified on Aug. 13, 2009, 3 pages.

* cited by examiner

*Primary Examiner* — Stephen Elmore
(74) *Attorney, Agent, or Firm* — Lowenstein Sandler PC

(57) ABSTRACT

Some embodiments of a system and a method to dynamically allocate memory to applications have been presented. For instance, an application interface executing on a processing device running in a computing system receives a request from an application running on the processing device for a predetermined capacity of memory. A kernel running on the processing device may allocate one or more consecutive heaps of memory to the application in response to the request. A total capacity of the heaps allocated is at least the predetermined capacity requested.

24 Claims, 4 Drawing Sheets

DYNAMIC MEMORY ALLOCATION FOR APPLICATIONS

TECHNICAL FIELD

Embodiments of the present invention relate to memory allocation, and more specifically to dynamic memory allocation for applications.

BACKGROUND

Currently, memory allocation for applications in many conventional operating systems (e.g., Linux, Unix, etc.) works by having one heap for each application, which can grow and shrink and in which all allocated memory is being held. A heap as used herein broadly refers to an area in memory reserved for data that is created at runtime. This generally works well as long as an application allocates memory in a sane manner, but there are a few shortcomings that tend to have some negative effects, especially for applications that allocate and deallocate lots of small chunks of memory (which most larger applications do, such as Firefox, Thunderbird, Evolution, etc.).

One of the negative effects is memory fragmentation over time. Due to the fact that newly allocated memory cannot always be fitted perfectly in a free space in the heap over time, the heap will have "holes" with unused non-allocated memory. Also, de-allocating memory inside the heap will increase fragmentation as well.

Another issue with the current approach is that heap can only shrink in size to the highest still allocated memory pointer. This comes from the fact that the heap cannot be re-organized so if an application frees memory at the start or middle of the heap, it is generally impossible to shrink the heap. In one extreme case, an application may allocate large amounts of memory and keep the last allocated pointer until the application finishes. That way the heap would be stuck at the maximum until the end of the application. This can happen in real life situations where at the end of a function memory for the result is being allocated before the work data is deallocated.

Furthermore, heap memory is resident set memory, which means that the whole heap is considered allocated memory towards the kernel. Under memory pressure, everything inside the heap of an application needs to be swapped out, even the unused "holes" inside the heap. A hole in general refers to a contiguous area of memory in the heap that does not map to any part of the main memory, and hence, cannot be used by the application. Currently, this can be worked around by using an undocumented call named malloc_trim( ) in GNU C Library (Glibc) in a Linux system, but that call is very computationally intensive and would either require some heuristics in Glibc when to call it or even changes in applications to use it when they have de-allocated large amounts of memory.

BRIEF DESCRIPTION OF THE DRAWINGS

The present invention is illustrated by way of example, and not by way of limitation, in the figures of the accompanying drawings and in which.

DETAILED DESCRIPTION

Figure 1:
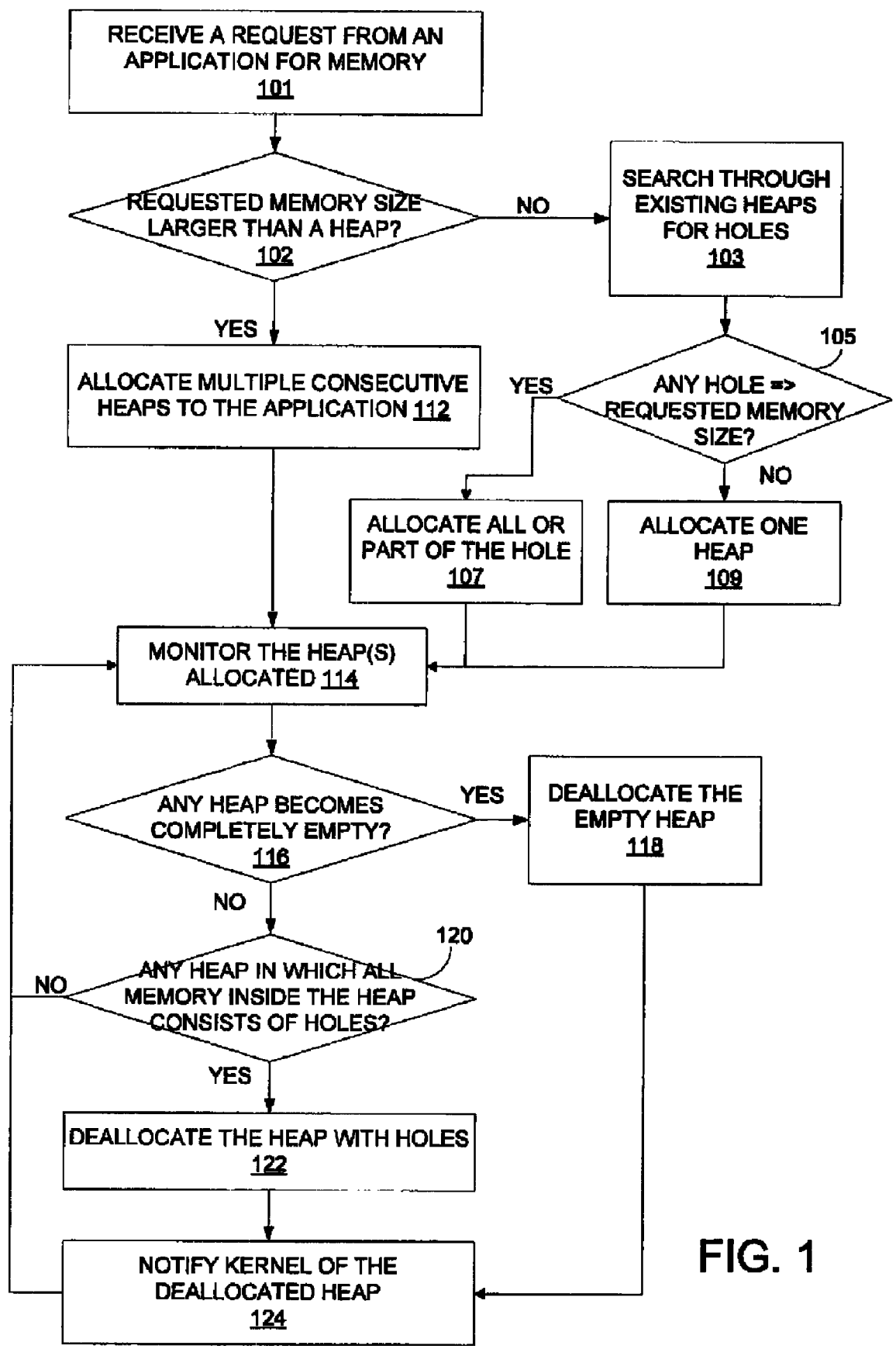
FIG. 1 illustrates a flow diagram of one embodiment of a method to dynamically allocate memory for an application.

Described herein are some embodiments of a method, an apparatus, and a system to dynamically allocate memory to applications. In one embodiment, an application interface executing on a processing device running in a computing system receives a request from an application running on the processing device for a predetermined capacity of memory. A kernel running on the processing device may allocate one or more consecutive heaps of memory to the application in response to the request. Note that these heaps are generally smaller in size than the conventional heap discussed above. A total capacity of the heaps allocated is at least the predetermined capacity requested. Unlike the conventional approach discussed above, where only one single big heap is allocated to a requesting application, multiple smaller heaps are dynamically allocated to the requesting application as needed. More details of some embodiments of how to dynamically allocate memory to applications are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "allocating" or "computing" or "de-allocating" or "determining" or "monitoring" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a flow diagram of one embodiment of a method to dynamically allocate memory for an application running in a computing system, such as a server, a personal computer (PC), a handheld device (e.g., a personal digital assistant, a smart phone, etc.), etc. The method may be performed by processing logic that may comprise hardware (e.g., circuitry, dedicated logic, programmable logic, microcode, etc.), software (such as instructions run on a processing device), firmware, or a combination thereof. For instance, the computing system 300 illustrated in FIG. 3 may perform at least part of the method in some embodiments.

Initially, processing logic receives a request from an application for memory (processing block 101). The request may specify the capacity of memory the application needs. In response to the request, processing logic checks if the requested memory size is larger than a heap (processing block 102). If the requested memory size is larger than a heap, then processing logic allocates multiple consecutive heaps of memory to the application (processing block 112). In some embodiments, the memory in the computing system, which includes a number of memory pages, is divided into heaps of the same size. Each heap may be defined to be a fixed number of memory pages, such as 1, 2, 3, 4, etc. Unlike some conventional memory discussed above, the size of each heap is not dependent on the capacity of memory requested by the application. Rather, the size of each heap is fixed according to some embodiments of the invention. As such, an appropriate number of heaps are allocated to the application depending on the capacity of memory requested by the application. For example, if a heap is defined to be 64 kByte, then a total of 16 heaps are allocated to an application requesting 1 MByte of memory. To allocate the heaps to the application, processing logic may reserve those heaps for the sole use of the application. Note that the application may request more memory later while the application is running. Processing logic may allocate additional heap(s) to the application as needed by computing how many heaps are required to meet the request.

However, if the requested memory size is not larger than a heap, then processing logic further searches through existing heaps for holes (processing block 103). Processing logic checks if there is any hole in the existing heaps larger than or equal to the requested memory size (processing block 105). If there is such a hole, then processing logic allocates all or part of the hole to the application (processing block 107). Otherwise, processing logic allocates a single heap to the application (processing block 109).

In some embodiments, processing logic monitors the heap(s) allocated to the application while the application is running (processing block 114). Processing logic may determine if any one of the heaps allocated becomes completely empty (processing block 116). If so, then processing logic may de-allocate the empty heap (processing block 118) and transition into processing block 124. Otherwise, processing logic checks if any heap in which all memory inside the heap consists of holes (processing block 120). Note that the holes may or may not be of the same size. If there is such a heap, then processing logic may de-allocate the heap with holes (processing block 122) and transition into processing block 124. Otherwise, processing logic returns to processing block 114 to continue monitoring the heaps allocated. To de-allocate a heap, processing logic may release the heap from the application. In other words, the application can no longer use the heap released, unless the heap is allocated to the application again. In some embodiments, a threshold amount of holes may be set so that processing logic does not de-allocate a heap unless the amount of holes developed in the heap exceeds the threshold amount.

In processing block 124, processing logic notifies, using an interface from an interface library, a kernel running on the computing system of the de-allocated heap. Knowing that the heap has been de-allocated, the kernel may reuse the de-allocated heap. For example, the kernel may re-allocate the heap to another application requesting memory. By dynamically de-allocating heaps when the heaps become empty or develop holes, the kernel can re-use the de-allocated heaps. As a result, the overall efficiency of memory usage can be improved. Unlike the above dynamic approach, in some conventional memory, where a single heap is allocated to an application, de-allocation of part of the single heap and subsequent re-use of part of the single heap by the kernel are difficult, if not infeasible.

Figure 2A:
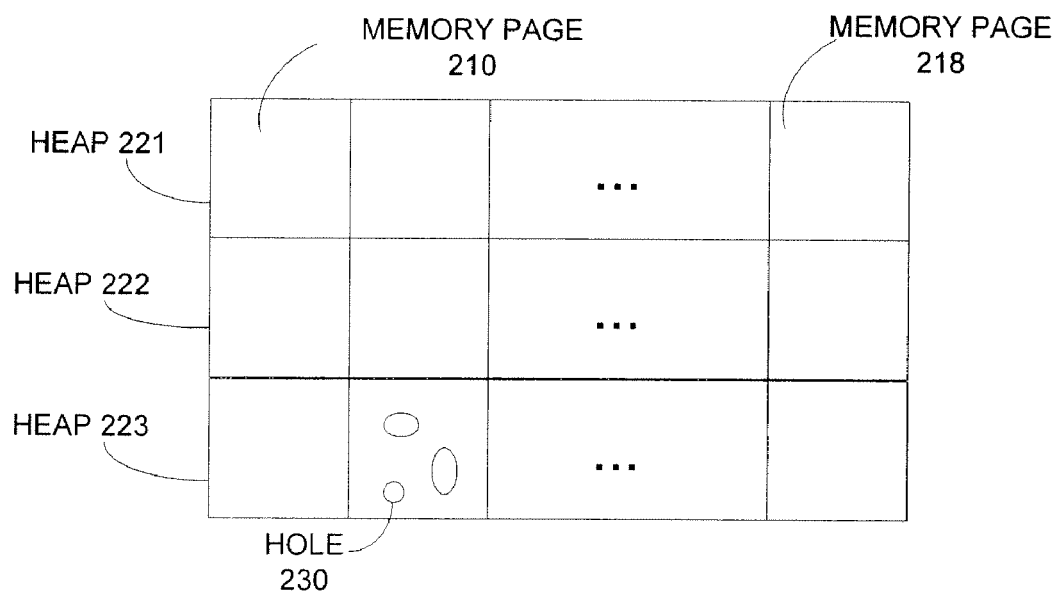
FIGS. 2A and 2B illustrate one embodiment of a set of heaps of memory.
Figure 2B:
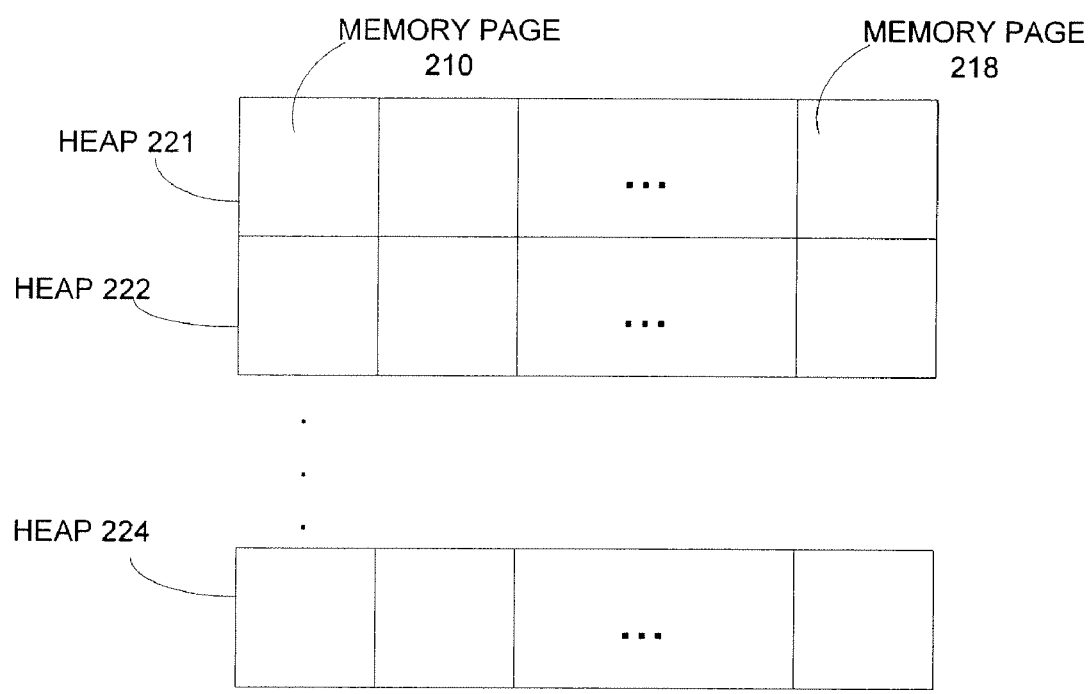

FIGS. 2A and 2B illustrate one embodiment of a set of heaps of memory in a computing system. Referring to FIG. 2A, there are at least three heaps 221-223 in the memory. Each heap is of the same size and has the same fixed number of memory pages. In some embodiments, the memory pages in each heap are consecutive, such as memory pages 210-218 in heap 221.

In some embodiments, heaps 221-223 are allocated to an application that has requested memory of a size larger than 2 heaps, but smaller or equal to 3 heaps. While the application is running, heaps 221-223 are monitored to determine if any of heaps 221-223 has become empty over time. If one of heaps 221-223 has become empty, the empty heap may be de-allocated in order to free up the empty heap for other usages. For instance, a kernel of the computing system may re-allocate the heap to another application.

After the application has run for a certain period of time, some holes (such as hole 230) have developed in memory page 214 of heap 223. Note that the holes may or may not be of the same size. Because these holes in memory page 214 are not used by the application, memory page 214 is not used efficiently. Thus, heap 223 may be de-allocated if all memory inside heap 223 consists of holes. Once de-allocated, a kernel in the computing system may re-use the heap 223, which is now free of holes. Note that additional heap(s) may then be allocated to the application if the application needs more memory. Referring to FIG. 2B, heap 224 is allocated to the application after heap 223 has been de-allocated from the application. For instance, the application may request additional memory from the kernel after heap 223 has been de-allocated. Alternatively, a heap may be automatically allocated to the application once heap 223 is de-allocated because of the holes developed.

Figure 3:
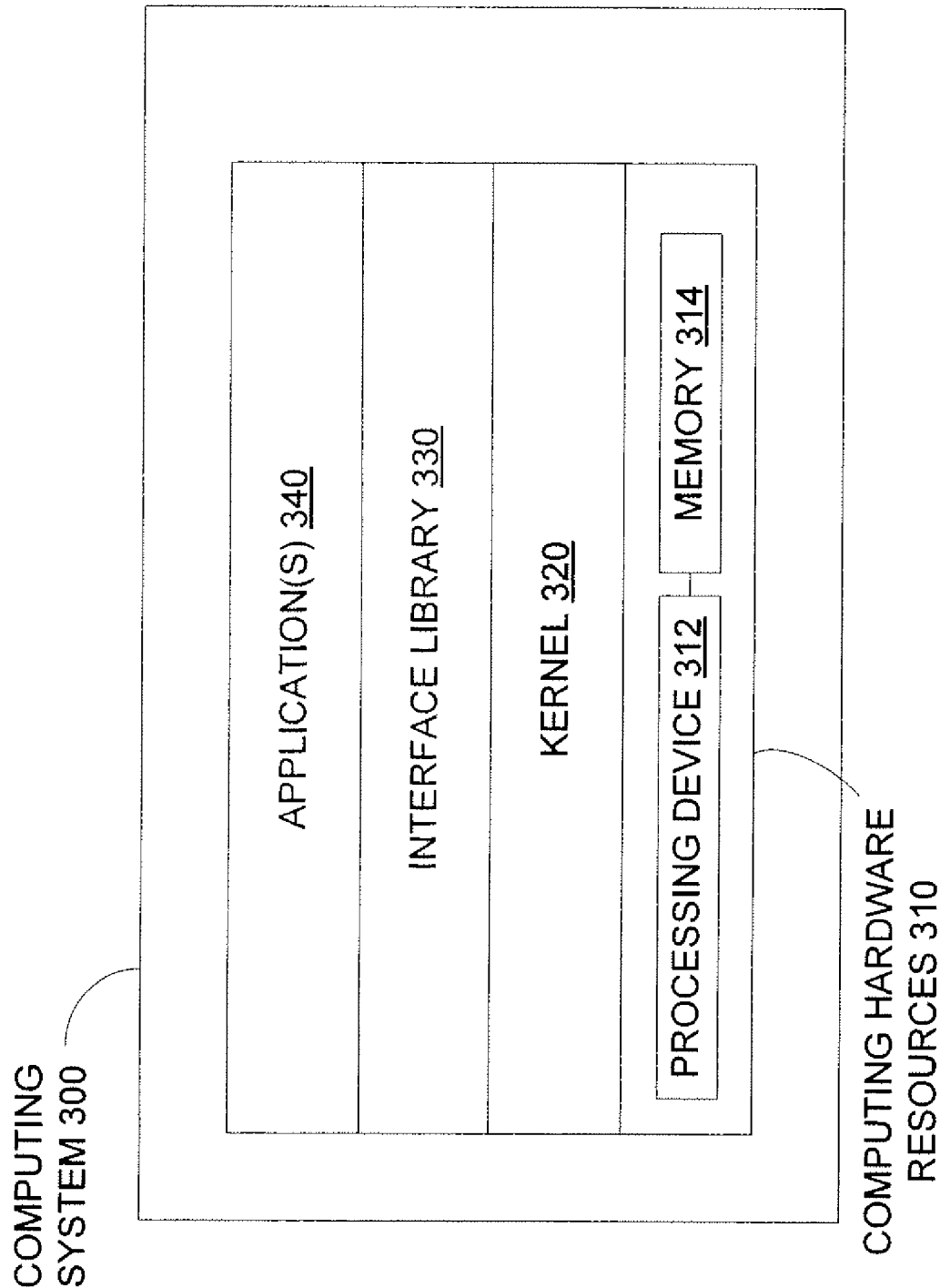
FIG. 3 illustrates one embodiment of a computing system.

FIG. 3 illustrates one embodiment of a computing system. The computing system 300 includes some computing hardware resources 310, including a processing device 312 and a memory 314. Note that the computing hardware resources 310 may include additional hardware components (e.g., a graphics processor, a network card, etc.) in different embodiments. In some embodiments, a kernel 320 runs on the computing hardware resources 310, including the processing device 312. One or more applications 340 may run on kernel 320. An interface library 330 between applications 340 and kernel 320 provides application interfaces to allow applications 340 to run on kernel 320. For example, if the computing system 300 is a Linux system, then the interface library 330 may include GNU C Library (Glibc).

In some embodiments, the memory 314 is divided into a number of heaps having the same size. For example, each heap may include the same fixed number of memory pages. Note that these heaps are generally smaller than the conventional heaps discussed above. Each of the applications 340 may request from kernel 320 a certain capacity of memory through an interface in the interface library 330. In response to a request, kernel 320 may compute how many heaps should be allocated to the requesting application. A total capacity of the number of heap(s) allocated is at least the capacity of memory requested. If the requested memory size is equal to one heap, then kernel 320 may allocate a heap. If the requested memory size is smaller than one heap, then kernel 320 may search through existing heaps already allocated to other applications to determine if there is any hole larger or equal to the requested memory size. If there is such a hole, than kernel 320 may allocate all or part of this hole. Otherwise, kernel 320 may allocate a heap.

After the initial allocation of heaps, one or more application interfaces in the interface library 330 may monitor the heaps allocated. If one of the heaps allocated has become empty, or holes have developed in the heap such that all memory inside the heap consists of holes, then the application interfaces may de-allocate the heap and notify kernel 320 of the de-allocated heap. Knowing that the heap has been de-allocated from the application, kernel 320 may re-use the de-allocated heap. Note that one or more of applications 340 may request additional memory after the initial memory allocation. In response, kernel 320 may allocate the appropriate number of additional heaps to the requesting applications based on the size of the additional memory requested. Details of some embodiments of the dynamic allocation of heaps have been discussed above with reference to FIGS. 1 and 2A-2B.

Another advantage of the above approach is that only kernel 320 and interface library 330 have to be modified to implement the above approach. No change in the applications 340 is needed for the above approach. In other words, applications 340 do not even have to be re-compiled.

Figure 4:
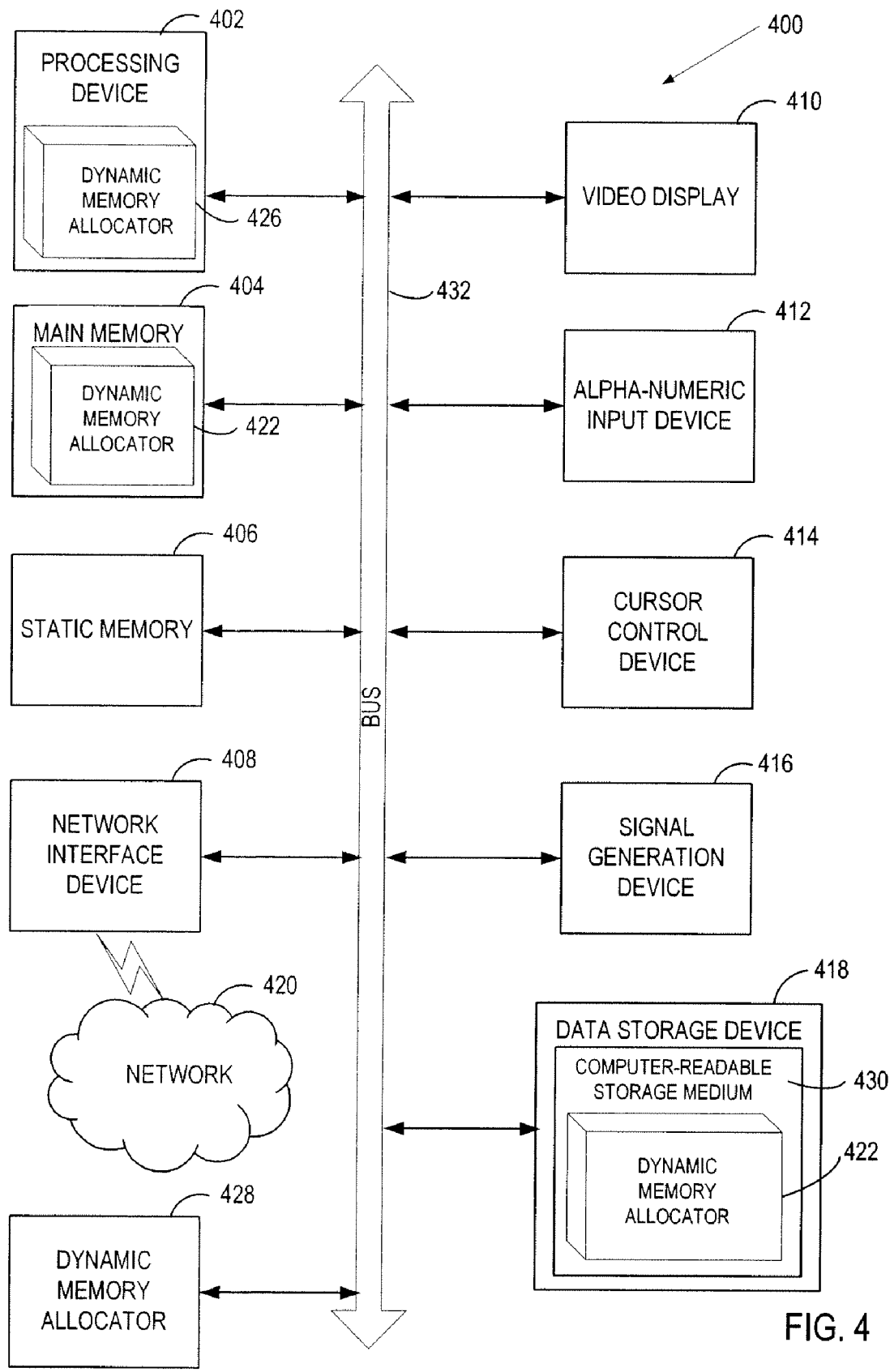
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the dynamic memory allocator 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., dynamic memory allocator 422) embodying any one or more of the methodologies or functions described herein. The dynamic memory allocator 422 may also reside, completely or at least partially, within the main memory 404 and/or within the processing device 402 during execution thereof by the computer system 400, the main memory 404 and the processing device 402 also constituting computer-accessible storage media. The dynamic memory allocator 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The dynamic memory allocator 428, components and other features described herein (for example, in relation to FIG. 2) can be implemented as discrete hardware components or integrated into the functionalities of hardware components, such as ASICS, FPGAs, DSPs, or similar devices. In addition, the dynamic memory allocator 428 can be implemented as firmware or functional circuitries within hardware devices. Further, the dynamic memory allocator 428 can be implemented in any combination of hardware devices and software components.

Thus, some embodiments of a system and a method to dynamically allocate memory to applications have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device, a request from an application for a capacity of memory;
   allocating, by a kernel executed by the processing device, one or more consecutive heaps of memory to the application, wherein a total capacity of the one or more consecutive heaps of memory is at least the capacity requested;
   de-allocating, by the processing device, a heap of the one or more consecutive heaps of memory from the application when a capacity of memory needed by the application drops below a threshold; and
   notifying, by the processing device, the kernel of the de-allocating.

2. The method of claim 1, wherein the one or more consecutive heaps of memory is a plurality of consecutive heaps of memory.

3. The method of claim 1, further comprising:
   de-allocating, by the processing device, a heap of the one or more consecutive heaps of memory from the application when a plurality of holes have developed in the heap such that all memory inside the heap consists of the plurality of holes; and
   notifying, by the processing device, the kernel of the de-allocating of the heap.

4. The method of claim 1, further comprising:
   re-using, by the kernel, a heap of the one or more consecutive heaps of memory when the heap has been de-allocated from the application.

5. The method of claim 1, further comprising:
   allocating, by the kernel, a heap of the one or more consecutive heaps of memory to a second application when the heap has been de-allocated from the application.

6. The method of claim 1, further comprising:
   allocating, by the kernel, an additional heap of memory to the application when the application requests more memory.

7. The method of claim 1, wherein the one or more consecutive heaps have the same capacity of memory.

8. The method of claim 1, wherein each of the one or more consecutive heaps comprises a fixed number of memory pages.

9. An apparatus comprising:
   a memory divided into multiple heaps; and
   a processing device coupled to the memory, to:
      receive a request for a capacity of memory from an application executed by the processing device,
      execute a kernel to allocate one or more consecutive heaps of the multiple heaps to the application, wherein a total capacity of the one or more consecutive heaps is at least the capacity requested,
      de-allocate a heap of the one or more consecutive heaps from the application when a plurality of holes have developed in the heap such that all memory inside the heap consists of the plurality of holes, and
      notify the kernel of the de-allocating of the heap.

10. The apparatus of claim 9, wherein the processing device is also to:
    de-allocate a heap of the one or more consecutive heaps from the application when a capacity of memory needed by the application drops below a threshold, and
    notify the kernel of the de-allocating of the heap.

11. The apparatus of claim 9, wherein the one or more consecutive heaps of memory is a plurality of consecutive heaps of memory.

12. The apparatus of claim 9, wherein the kernel re-uses a heap of the one or more consecutive heaps when the heap has been de-allocated from the application.

13. The apparatus of claim 9, wherein the kernel allocates a heap of the one or more consecutive heaps of memory to a second application when the heap has been de-allocated from the application.

14. The apparatus of claim 9, wherein the kernel allocates an additional heap to the application when the application requests more memory.

15. The apparatus of claim 9, wherein the one or more consecutive heaps have the same capacity of memory.

16. The apparatus of claim 9, wherein each of the one or more consecutive heaps comprises a fixed number of memory pages.

17. A non-transitory computer-readable storage medium embodying instructions that, when executed by a processing device, will cause the processing device to perform a method comprising:
    receiving, by the processing device, a request from an application for a capacity of memory; and
    allocating, by a kernel executed by the processing device, one or more consecutive heaps of memory to the application, wherein a total capacity of the one or more consecutive heaps of memory is at least the capacity requested;
    re-using, by the kernel, a heap of the one or more consecutive heaps of memory when the heap has been de-allocated from the application.

18. The non-transitory computer-readable storage medium of claim 17, further comprising:
    de-allocating, by the processing device, a heap of the one or more consecutive heaps of memory from the application when a capacity of memory needed by the application drops below a threshold; and
    notifying, by the processing device, the kernel of the de-allocating of the heap.

19. The non-transitory computer-readable storage medium of claim 17, further comprising:
    de-allocating, by the processing device, a heap of the one or more consecutive heaps of memory from the application when a plurality of holes have developed in the heap such that all memory inside the heap consists of the plurality of holes; and
    notifying, by the processing device, the kernel of the de-allocating of the heap.

20. The non-transitory computer-readable storage medium of claim 17, wherein the one or more consecutive heaps of memory is a plurality of consecutive heaps of memory.

21. The non-transitory computer-readable storage medium of claim 17, further comprising:
  allocating, by the kernel, a heap of the one or more consecutive heaps of memory to a second application when the heap has been de-allocated from the application.

22. The non-transitory computer-readable storage medium of claim 17, further comprising:
  allocating, by the kernel, an additional heap of memory to the application when the application requests more memory.

23. The non-transitory computer-readable storage medium of claim 17, wherein the one or more consecutive heaps have the same capacity of memory.

24. The non-transitory computer-readable storage medium of claim 17, wherein each of the one or more consecutive heaps comprises a fixed number of memory pages.

\* \* \* \* \*